United States Patent
Tucker et al.

(10) Patent No.: US 10,142,806 B2
(45) Date of Patent: *Nov. 27, 2018

(54) METHOD AND APPARATUS FOR PERSISTENT CONNECTIONS TO A DEVICE THROUGH THE USE OF MULTIPLE PHYSICAL NETWORK CONNECTIONS AND CONNECTION HAND-OFFS BETWEEN MULTIPLE BANDS, MODES AND NETWORKS

(71) Applicant: CoCo Communications Corp., Seattle, WA (US)

(72) Inventors: Mark L. Tucker, Seattle, WA (US); Jeremy Bruestle, Seattle, WA (US)

(73) Assignee: CoCo Communications Corp, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,830

(22) Filed: Feb. 29, 2016

(65) Prior Publication Data

US 2016/0249188 A1   Aug. 25, 2016

Related U.S. Application Data

(63) Continuation of application No. 14/673,553, filed on Mar. 30, 2015, now Pat. No. 9,277,376, which is a
(Continued)

(51) Int. Cl.
*G06F 15/173*   (2006.01)
*H04W 4/12*   (2009.01)
(Continued)

(52) U.S. Cl.
CPC ........... *H04W 4/12* (2013.01); *H04B 17/318* (2015.01); *H04L 69/08* (2013.01); *H04L 69/14* (2013.01);
(Continued)

(58) Field of Classification Search
USPC ............... 709/223, 206, 228; 455/439, 406; 257/103; 370/349
See application file for complete search history.

(56) References Cited

U.S. PATENT DOCUMENTS 5,764,915 A   6/1998  Heimsoth et al.
5,978,679 A   11/1999 Agre
(Continued)

FOREIGN PATENT DOCUMENTS

EP       0748064 A2      12/1996
JP       2001-054168     2/2001
(Continued)

OTHER PUBLICATIONS

Pahlavan,K., et al., "Handoff in Hybrid Mobile Data Networks," Personal Communications, IEEE, Apr. 2000, pp. 34-47, vol. 7, Issue: 2. Worcester Polytechnic Institute, MA.

*Primary Examiner* — Tammy Nguyen
(74) *Attorney, Agent, or Firm* — Lowe Graham Jones LLC

(57) ABSTRACT

Embodiments communicate messages between mobile devices and destination devices. An exemplary embodiment includes a first border server operable to establish a first communication connection to the mobile device over a first network operating under a first protocol, a second border server operable to establish a second communication connection to the mobile device over a second network operating under a second protocol, and a transport management server communicatively coupled to the first border server and the second border server, and operable to establish a third communication connection to the destination device over a third network operating under a third protocol. The first protocol is configured to communicate a first encapsulated portion of the message. The second protocol is configured to communicate a second encapsulated portion of the
(Continued)

message. The third protocol is configured to communicate the first encapsulated portion of the message and the second encapsulated portion of the message.

20 Claims, 9 Drawing Sheets

Related U.S. Application Data continuation of application No. 14/193,820, filed on Feb. 28, 2014, now Pat. No. 8,996,678, which is a continuation of application No. 13/471,109, filed on May 14, 2012, now Pat. No. 8,667,115, which is a continuation of application No. 12/624,250, filed on Nov. 23, 2009, now Pat. No. 8,180,879, which is a continuation of application No. 10/512,943, filed as application No. PCT/US03/13443 on Apr. 29, 2003, now Pat. No. 7,624,165.

(60) Provisional application No. 60/377,631, filed on May 3, 2002.

(51) Int. Cl.
| | | |
|---|---|---|
| H04W 36/28 | (2009.01) | |
| H04L 29/06 | (2006.01) | |
| H04W 4/00 | (2018.01) | |
| H04W 4/18 | (2009.01) | |
| H04B 17/318 | (2015.01) | |
| H04W 28/08 | (2009.01) | |
| H04W 36/00 | (2009.01) | |
| H04W 80/00 | (2009.01) | |
| H04W 88/06 | (2009.01) | |

(52) U.S. Cl.
CPC ............ *H04L 69/18* (2013.01); *H04W 4/005* (2013.01); *H04W 4/18* (2013.01); *H04W 36/28* (2013.01); *H04W 28/08* (2013.01); *H04W 36/0011* (2013.01); *H04W 36/0022* (2013.01); *H04W 80/00* (2013.01); *H04W 88/06* (2013.01)

(56) References Cited

U.S. PATENT DOCUMENTS

| | | |
|---|---|---|
| 6,201,962 B1 | 3/2001 | Sturniolo |
| 6,201,963 B1 | 3/2001 | Nakamura et al. |
| 6,243,581 B1 | 6/2001 | Jawanda |
| 6,278,697 B1 | 8/2001 | Brody |
| 6,434,393 B1 | 8/2002 | Einola |
| 6,453,346 B1 | 9/2002 | Garg et al. |
| 6,560,633 B1 | 5/2003 | Roberts et al. |
| 6,580,633 B2 | 6/2003 | Inoue et al. |
| 6,781,962 B1 | 8/2004 | Williams et al. |
| 6,801,755 B2 | 10/2004 | Kardach et al. |
| 6,845,094 B1 | 1/2005 | Zhang |
| 6,922,394 B2 | 7/2005 | Kajiwara |
| 7,050,414 B2 | 5/2006 | Lin |
| 7,082,114 B1 | 7/2006 | Engwer et al. |
| 7,099,295 B1 | 8/2006 | Doyle et al. |
| 7,126,945 B2 | 10/2006 | Beach |
| 7,171,191 B2 | 1/2007 | Olson |
| 7,263,368 B2 | 8/2007 | Knauerhase et al. |
| 7,269,793 B2 | 9/2007 | Horsfall et al. |
| 7,370,077 B2 | 5/2008 | Pradhan et al. |
| 7,408,906 B2 | 8/2008 | Griswold et al. |
| 7,480,272 B2 * | 1/2009 | Baba ................ H04W 36/0011 370/331 |
| 7,680,134 B2 * | 3/2010 | Nanji ................ H04L 12/2856 370/395.52 |
| 9,319,311 B2 * | 4/2016 | Wang ................ H04L 45/306 |
| 9,860,079 B2 * | 1/2018 | Cohn ................ H04L 12/4633 |
| 2002/0022483 A1 | 2/2002 | Thompson et al. |
| 2002/0040366 A1 | 4/2002 | Lahr |
| 2002/0045450 A1 | 4/2002 | Shimizu et al. |
| 2002/0055371 A1 | 5/2002 | Amon et al. |
| 2002/0068544 A1 | 6/2002 | Barzilay et al. |
| 2002/0133598 A1 | 9/2002 | Strahm et al. |
| 2003/0110227 A1 | 6/2003 | O'Hagan |
| 2009/0010259 A1 * | 1/2009 | Sirotkin ................ H04L 47/10 370/392 |
| 2011/0271007 A1 * | 11/2011 | Wang ................ H04L 45/306 709/238 |
| 2012/0243544 A1 * | 9/2012 | Keesara ................ H04L 12/4633 370/395.53 |
| 2013/0223445 A1 | 8/2013 | Palani |
| 2013/0250803 A1 | 9/2013 | Abraham et al. |
| 2013/0266014 A1 * | 10/2013 | Blomquist ............ H04L 45/7453 370/392 |
| 2013/0287028 A1 * | 10/2013 | Ashwood-Smith ..... H04L 45/74 370/392 |
| 2015/0071122 A1 * | 3/2015 | Addanki ................ H04L 41/0886 370/255 |
| 2016/0127148 A1 * | 5/2016 | Xue ................ H04L 12/4633 370/254 |

FOREIGN PATENT DOCUMENTS

| | | |
|---|---|---|
| WO | 99/07116 A1 | 2/1999 |
| WO | 99/22530 A1 | 5/1999 |
| WO | 99/48312 A1 | 9/1999 |
| WO | 00/67435 A1 | 11/2000 |
| WO | 01/52567 A2 | 7/2001 |
| WO | 02/27997 A2 | 4/2002 |
| WO | 02/28123 A2 | 4/2002 |

* cited by examiner

Figure 2
Protocol Stack in Border Server (CDMA)
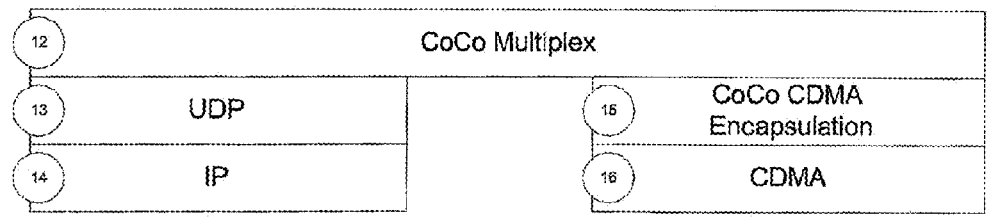
Protocol Stack in Multiplex Server
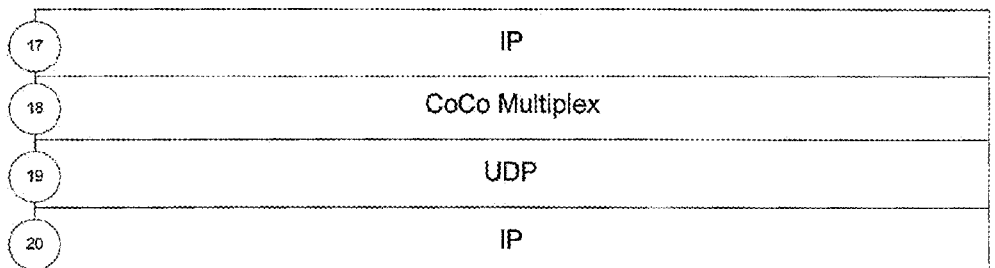
Protocol Stack in Transport Management Server
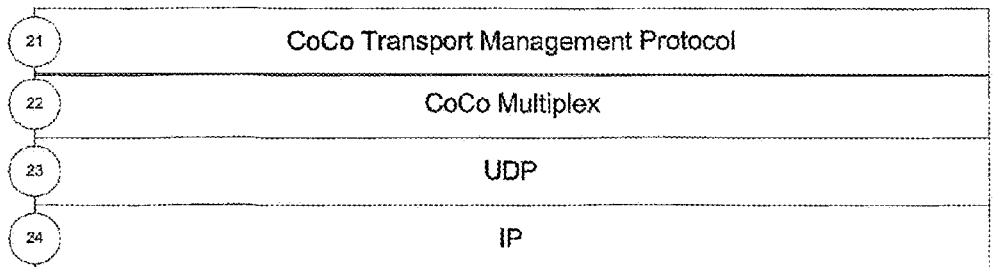

Connection Establishment

Figure 7 — Redundent Multiplex

METHOD AND APPARATUS FOR PERSISTENT CONNECTIONS TO A DEVICE THROUGH THE USE OF MULTIPLE PHYSICAL NETWORK CONNECTIONS AND CONNECTION HAND-OFFS BETWEEN MULTIPLE BANDS, MODES AND NETWORKS

PRIORITY CLAIM

This application is a Continuation of U.S. Utility application Ser. No. 14/673,553, filed Mar. 30, 2015, which is a Continuation of U.S. Utility application Ser. No. 14/193,820, filed on Feb. 28, 2014, issued to U.S. Pat. No. 8,996,678 on Mar. 31, 2015, which is a Continuation of U.S. Utility application Ser. No. 13/471,109, filed on May 14, 2012, and issued to U.S. Pat. No. 8,667,115 on Mar. 4, 2014, which is a Continuation of U.S. Utility application Ser. No. 12/624,250, filed on Nov. 23, 2009, and issued as U.S. Pat. No. 8,180,879 on May 15, 2012, which is a Continuation of U.S. Utility application Ser. No. 10/512,943, filed on Oct. 29, 2004, issued as U.S. Pat. No. 7,624,165 on Nov. 24, 2009, which is a U.S. National Stage application of International Patent Application Serial No. PCT/US2003/013443, filed Apr. 29, 2003, which claims the benefit of U.S. Provisional Application Ser. No. 60/377,631, filed on May 3, 2002, the contents of which are incorporated herein by reference in their entireties.

FIELD OF THE INVENTION

The following disclosure relates generally to communications systems, and more particularly, to maintaining persistent connections while switching within the same or to different networks operating in different frequency bands or utilizing different modes.

BACKGROUND OF THE INVENTION

Today there exist thousands of data and voice networks that utilize many different communications protocols and technologies. The most basic level of a network is the infrastructure, the physical equipment that utilizes power to send and receive electromagnetic, acoustic, or optical signals. The base communications protocol is a specific language that enables the sending and receiving devices to talk to each other, making sense of the signals. Additional protocols can be stacked on top of the base protocol to create other languages that can be transported by the physical devices. This higher-level language allows for communications over different types of infrastructures and signals.

A continuing trend is to enable communication between independent networks. This allows devices that could previously only communicate to devices on their respective network to communicate with devices on other networks. An example is the public Internet, a super network comprised of a collection of networks utilizing many different infrastructure technologies transmitting many types of signals utilizing many types of base communications protocols. The uniting element is the IP transport layer protocol, a common language known by each device.

Most devices are fixed and have one connection to a host network that in turn has a communications gateway for communications to other networks, such as the Internet. An example of this is the personal computer (PC) or telephone. There is typically no need for these devices to have multiple host network connections.

However, other types of devices are portable, such as mobile phones, personal digital assistants (PDA), and laptop computers. These portable devices typically need to have support for multiple network connections. A laptop computer often incorporates a modem to connect to a host network through a phone line when the laptop is at home and an Ethernet port to connect to the host network when the laptop is at the office. The laptop may also have an 802.11 (also known as "WiFi") PCMCIA card that connects to the host network of a coffee shop or other establishment. Rarely is the laptop connected to a network or even powered up while in transit between destinations.

The mobile phone is connected to its host network nearly at all times the phone is activated. This connection is a much more complicated process. The connection is established from the cell base station to the handset via over-the-air electromagnetic signals using a variety of communications protocols, such as TDMA, CDMA, GSM/GPRS, and the like. When the handset loses signal strength from one cell base station, it picks up a signal from one or more geographically closer cell base stations that have a stronger signal. The handset establishes a host network connection with one of the closer cell base stations and then terminates the original cell base station connection keeping the handset persistently connected to the network. This is called a connection "handoff" and is done today on mobile networks.

In the prior art, the handoff process can only be done within a carrier's physical network. For example, a Samsung phone communicating with the Sprint PCS network through a CDMA cell base station on the 2.3 GHz frequency will not be able to transcend to another disparate network, such as a GSM network operated by VoiceStrearn.

As voice and data networks come together there becomes a greater need for persistent connections for mobile devices across multiple frequency bands, communications protocols, and host networks. This is due to the increased processing power of a handheld device and the advanced services that can now be offered to a mobile user.

Both wireless consumers and wireless carriers would benefit from the ability to maintain persistent connections no matter where the consumer may be. As some of the advantages, connection quality can be improved, coverage can be expanded, costs can be lowered, premium data services may be provided, reduced capital expenditures, and improved speed to market.

Thus, by seamlessly merging network resources through the use of persistent connection technology the following benefits are created:

Improvements for the Consumer:
1) Extended service range
2) Improved connection quality (most notably at work, home, and events)
3) Lower cost with savings passed through from carrier due to public network access savings
4) Secure communications for both voice and data
5) No roaming hassles for voice or data
6) Single device that works on multiple networks
7) Single user interface for both device and services
8) True benefits of broadband wireless sooner
9) New and improved data services Benefits for the Carrier
1) Creates value added network through service offer differentiation
2) Reduces capital investment required to build out broadband network 3) Increases network usage by improving quality, expanding coverage and supporting data services with all types of infrastructures
4) Increases revenues through increased network usage and the ability to offer premium services
5) Ultimately produces IT savings by standardizing on IP communications protocol.
6) Reduces complexity of voice roaming
7) Naturally allows for data roaming
8) Utilizes excess wireline capacity

SUMMARY OF THE INVENTION

Embodiments provide an apparatus, system and method for communicating a message between a mobile device and a destination device. An exemplary embodiment has a first border server operable to establish a first communication connection to the mobile device over a first network operating under a first protocol, wherein the first protocol is configured to communicate a first encapsulated portion of the message; a second border server operable to establish a second communication connection to the mobile device over a second network operating under a second protocol, wherein the second protocol is configured to communicate a second encapsulated portion of the message; and a transport management server communicatively coupled to the first border server and the second border server, and operable to establish a third communication connection to the destination device over a third network operating under a third protocol, wherein the third protocol is configured to communicate the first encapsulated portion of the message and the second encapsulated portion of the message. The second network is different from the first network. The second protocol is different from the first protocol. And, the first communication connection and the second communication connection are concurrently established. These and other examples of the invention will be described in further detail below.

BRIEF DESCRIPTION OF THE DRAWINGS

FIG. 2 is a protocol layering diagram of the protocol stack used in the various servers at a network operations center (NOC).

DETAILED DESCRIPTION OF THE PREFERRED EMBODIMENTS

Figure 1:
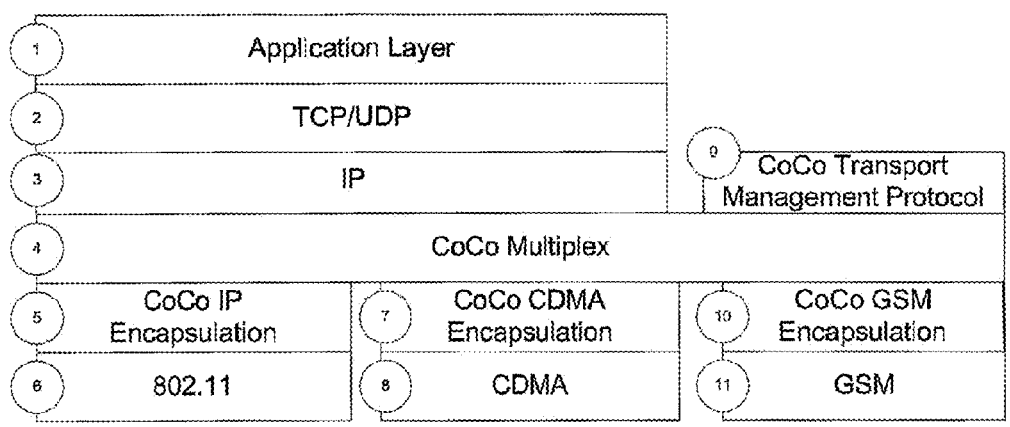
FIG. 1 is a protocol layering diagram of the protocol stack used in the mobile device.

A method and apparatus for maintaining a persistent connection to at least one network, such that said persistent connection can transcend various network protocols and infrastructures, is described in detail herein. In the following description, numerous specific details are provided, such as specific wireless and wireline protocols, specific types of devices (laptops, cell phones, PDA's), to provide a thorough understanding of, and enabling description for, embodiments of the invention. One skilled in the relevant art, however, will recognize that the invention can be practiced without one or more of the specific details, or with protocols or devices, methods, etc. In other instances, well-known structures or operations are not shown, or are not described in detail, to avoid obscuring aspects of the invention.

The description below describes a method and system to merge separate physical networks consisting of multiple frequency bands, communications protocols, and hosts by creating a logical network layer that is capable of keeping a persistent connection with a stationary or in motion device.

The description below describes a method and system to provide multiple connections to a device from separate physical networks through the same logical network layer that keeps connections persistent. In order to keep connections persistent and change physical networks at least one additional connection is needed to seamlessly accomplish the "hand-off". Multiple connections can increase the overall signal strength to the device. If one or more signals from the network host to the device are week or degraded then multiple connections can provide redundancy of data being sent from the host to the device reducing the amount of lost data. Multiple connections can be used to increase the amount of data that can be sent to the device at any given time, the bandwidth. This is desirable because it improves the efficiency of frequency usage by allocating it in an on demand manner. Also, data delivery rates can increase, which improves the services the device can support. Furthermore, it is desirable to increase the rate data is transmitted to the device without replacing existing physical infrastructure or licensing new spectrum.

The description below describes a method and system that provides this logical network layer in a way that requires no modifications in the underlying hardware or software required by the physical network host or the device. This approach is taken to provide backward and forward compatibility for physical infrastructure, communications protocols and signal type. It does not preclude the embedding of the present invention into future versions of software or hardware in the areas stated above. On the contrary, it is expected that the inclusion of the present invention will decrease the size and complexity of future product versions. This network neutral approach is possible through the addition of the client software on the device and the use of the present invention's server software at the NOC. Thus, no special alteration of the physical network is needed to deploy the present invention.

The description below describes a method and system that makes use of both voice and data physical networks to keep multiple persistent connections in such a way that the logical network layer can deliver both voice and data communications through any connection regardless of the primary intent of the physical network. This is accomplished through the present invention by providing a digital-based or packet-based Logical network layer on top of the physical network. This allows for non-digital communications protocols to carry digital protocols. In addition voice communication is digitally represented at the logical network layer regardless of how the voice communication was initiated. This is commonly referred to as VOIP.

The description below describes a method and system that merges separate physical networks through persistent multiple connections in a way that does not interfere with or require a change in the way the physical network identifies the device for either data or voice connection establishments or communication transmissions. The present invention accommodates this through the use of device ID, phone number and device assigned IP "transparency". "Transparency" in this case means that the physical networks identify the device in the same manner they do currently. This is typically done through the assignment of a phone number or IP to the ID of the device or to the SIM card accompanying the device. Usually this is done during the process of activation or registration but could also be done at the time the device connects to the host physical network, authentication. The present invention passes this identification information to the appropriate physical network for each connection. However, "transparency" also means that the logical network layer masks this information from any portion of the device above the logical layer protocol stack. Similarly, the NOC outside of the present invention's multiplex and connection servers only identifies the device by the ID assigned by the logical network layer. Additionally the physical network is only aware of the connection that it has with the device. Thus, connections from other physical networks to the device are transparent from each other. When connection requests are made to the device from other devices the logical ID is used, which would typically be a published phone number or IP.

The description below describes a method and system for providing a persistent connection utilizing multiple physical network connections to a single device. The system is created through client and server software that creates a logical network layer that controls the communications to the device. This includes controlling both voice and data connections and transmissions and controlling the establishment and "hand-offs" of physical connections. The system provides for the monitoring of aggregate signal strength to the device and controlling the data transmission by optimizing for week signal redundancy or multiplexing connections to increase bandwidth. Additionally the system creates connection "transparency" for both the physical networks and external devices. Maintaining a device does this through a logical\physical network ID table and routing provided by the server multiplex and connection software.

Unless described otherwise below, the construction and operation of the various blocks shown in the Figures are of conventional design. As a result, such blocks need not be described in further detail herein, because they will be understood by those skilled in the relevant art. Such further detail is omitted for brevity and so as not to obscure the detailed description of the invention. Any modifications necessary to the blocks in the Figures (or other embodiments) can be readily made by one skilled in the relevant art based on the detailed description provided herein.

Further, where protocol layers and stacks are shown in the Figures, this type of description is known in the art, and can itself include various details that need not be described herein. Those skilled in the relevant art can create source code, microcode, program logic arrays or otherwise implement the invention based on the Figures and the detailed description provided herein. Further, while many of the embodiments are shown and described as being implemented in software, such embodiments could equally be implemented in hardware and be performed by one or more processors.

Further, the Figures and the associated discussion provide a general description of a suitable environment in which aspects of the invention can be implemented. Although not required, embodiments of the invention will be described in the general context of computer-executable instructions running on various devices. Those skilled in the relevant art will appreciate that aspects of the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. Aspects of the invention can be embodied in a special purpose computer or data processor that is specifically programmed, configured or constructed to perform one or more of the computer-executable instructions explained in detail below.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Overview of Protocols

Figure 4:
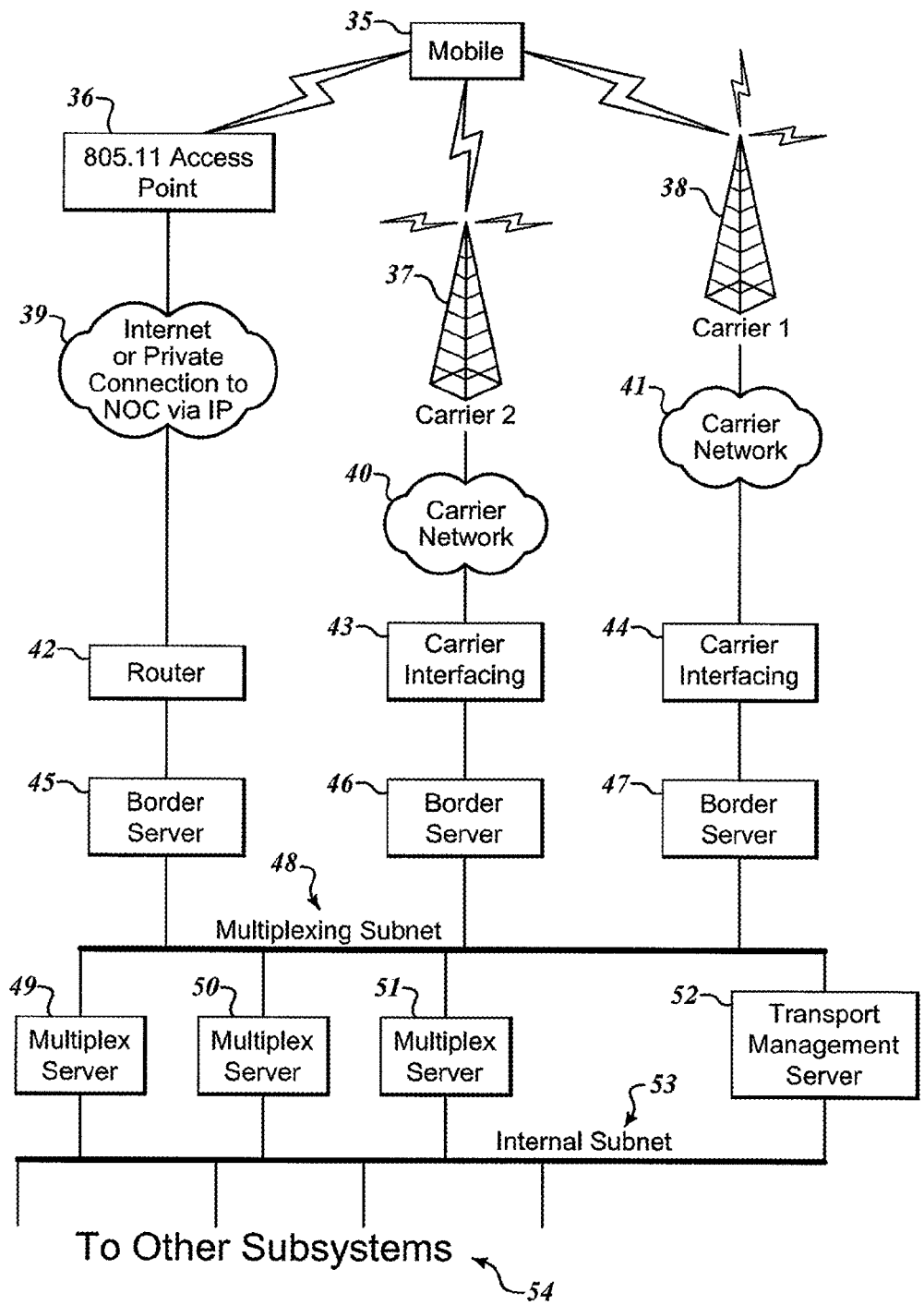
FIG. 4 shows the physical network layout that could be used in the NOC.

To facilitate user logical transparency, and physical network independence, the Transport Layer of the present invention (referred to as "CoCo") uses a number of protocols, some standard and some developed specifically for the purpose of the invention. In FIGS. 1 and 2 these protocols and their interrelations are shown. FIG. 4 shows the architecture of a network and mobile device 35 implementing the present invention. The logical transparency exists between layers 3 and 17, in that IP traffic originating on either the network side or the mobile device side is transported to and from the underlying network to the other unmodified. In fact, the multiplex server acts as a proxy on behalf of the mobile device.

The IP traffic is encoded and tagged with addressing information during it's passage to the CoCo Multiplex layer 4 an 18. This information is used by the intermediary machines such as the border server 45-47. Information between the border servers 45-47 and the mobile device 35 is further encoded using an encapsulation mechanism 7 and 15 specific to the underlying protocol (in this example CDMA), and then transported using that underlying protocol 8 and 16. Once arriving on the border server 45-47, parts of the Multiplex Subset 48 communicate using CoCo Multiplex over UDP (13, 19, 23).

The CoCo Multiplex Protocol is also used to allow the transport management module (28) and the transport management server (52) to communicate via layering another protocol, the transport management protocol (9,21) on top of CoCo Multiplex Protocol (4, 22).

Overview of Software Components in Mobile Device

Figure 3:
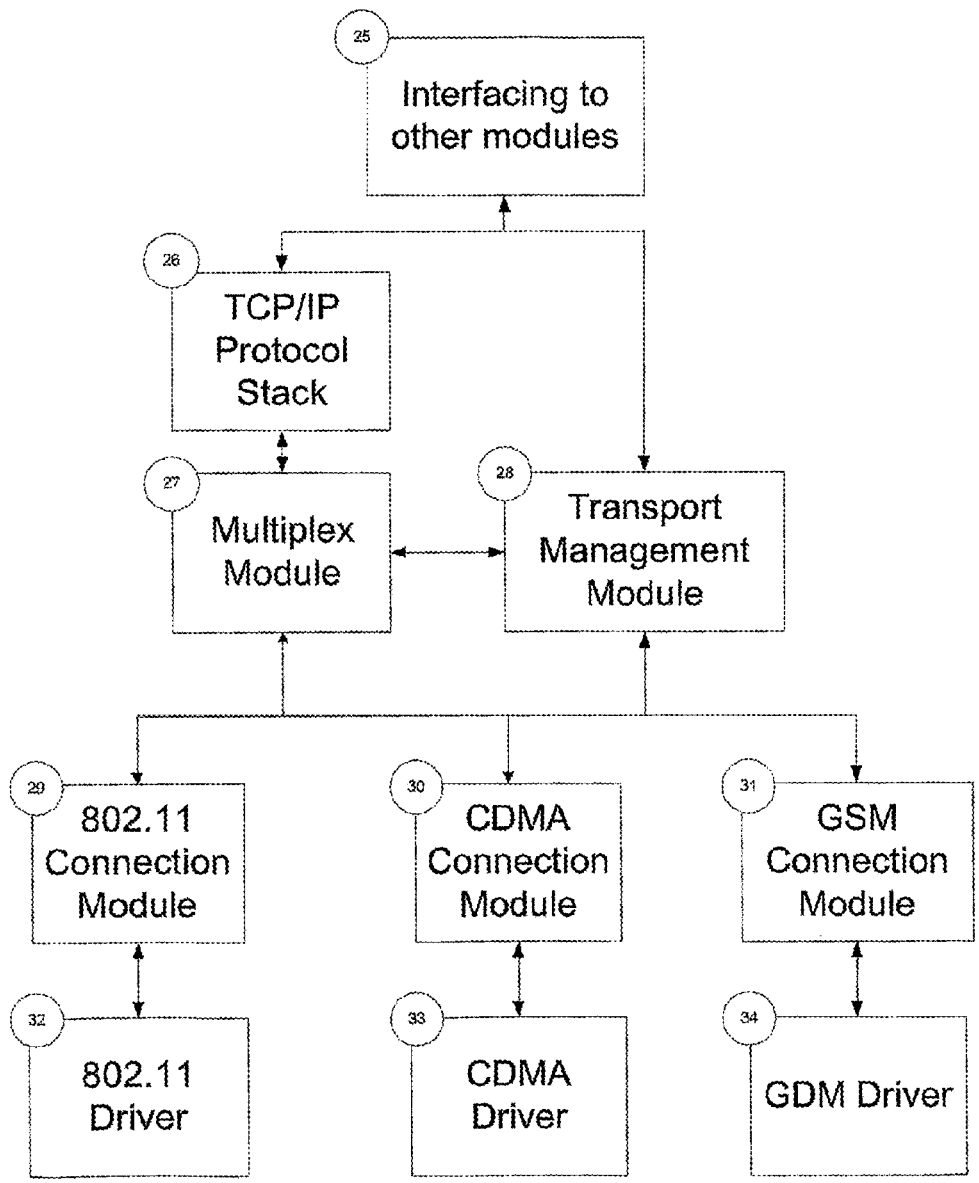
FIG. 3 is a diagram representing a method of dividing up the various software components in the mobile device information modules.

FIG. 3 details a method of componentizing the software within the mobile device 35. The interface 25 is the means by which other portions of the software on the mobile device 35 communicate over the CoCo Transport Layer. The TCP/

IP stack 26 is a normal TCP/IP stack similar to network software component of any network operating system. The TMM (Transport Management Modules, 28) though the interfacing 25 is instructed to modify the connection (for example, bringing the entire virtual connection (not a component physical connect) up and down, or changing the tuning parameters used to decide what physical networks to use). The TMM 28 also receives information about the connection state from the various connection modules, of which three examples were given 29, 30, 31. The TMM 28 also communicates with the MINI (Multiplex Module, 27), to change it's settings.

The MM 27 is in charge of actual data transport for the TCP/IP Stack 26 to the Connection Modules 29, 30, 31. The manner of subdividing the transport among the modules will be discussed in more detail below. The various connection modules 29, 30, 31 are in charge of doing encoding/decoding for their respective encapsulation layers 5, 7, 10 and passing the results to their respective drivers 32, 33, 34 which communicate to the lower level protocol layers 6, 8, 100, and eventually hardware.

Overview of the NOC (Network Operations Center) Transport Subsystem—

The NOC is the point of aggregation of all the various data paths used by the mobile device 35, and the external address location of the mobile. As is shown in FIG. 4, the mobile device 35 communicates via multiple technologies along various paths (such as 35→36→39→42→45 or 35→37→40→43→46), all of which terminate at a border server 45-47. This entire communication takes place using network addressing and protocols known to the hardware doing the transport (for example CDMA for CDMA networks), and does not require any of the intermediary components (along the paths above) to understand any of the CoCo protocols or make any special provisions.

Once arriving at a border server 45, 46, 47, the data is deencapsulated via the border server using it's understanding of the underlying technology (for example, 15, and 16 for CDMA). That is, each border server understands only how to deal with a specific technology in relation to encapsulation and transport. Once the deencapsulation is done, the border server should have a CoCo Multiplex 12 protocol message, which is either an encapsulated IP datagram 3 or a transport management protocol datagram 9. This is delivered to the appropriate place via encoding the CoCo Multiplex Protocol message in UDP 13 and sending it to the correct destination over the Multiplex Subnet 48.

There are various multiplex servers 49-52 each of which is assigned to one or more mobile devices, and acts as the device's proxy in relation to data transfer. There is also a transport management server 52 which manages connection state information for all mobile devices. This TMS 52 can be addressed via any machine on the Internal Subnet 53. Also, any machine on the Internal Subnet 53 can communicate to a given mobile device as though it were local by simply address it's proxy multiplex server (50 perhaps). If it is desired to make the mobile device 35 addressable from an external network (the Internet for example), routing can be set up to allow the multiplex server 50, to be made available to the external network through a gateway (part of 54) which is on the internal network 53.

One should note that the border servers 45-47 are all multi-homed on both the multiplex subnet 48 and a network specific to their own encapsulation method (42, 43, and 44 respectively). The multiplex servers (45, 46, 47) and the TMS 52 are similarly multi-homed, but between the Multiplex Subset 48 and an internal subnet 53. Note: it is not a requirement that there be a single internal subnet, different multiplex servers could be on different internal subnets, also, the TMS 52 does not have to be on the same internal subnet as the multiplex servers. In fact, if the internal subnet containing the multiplex servers is made externally addressable it would be advantageous from a security perspective for the TMS to go to its own subnet.

Connection Establishment/Teardown

The term "connection" refers to a given data path between the mobile device and the NOC, that is a specific set of hardware, protocols and addressing which can be used to move data from the mobile to the NOC. Further, the connection can refer to the communication of voice or data or both over the network. The virtual connection idea seen by the higher layers is a purely software construct whose state depends on the underlying connections. In this section when the term "connections" is used, this refers to the underlying, physical connections, not the transparent virtual one.

The decision to bring a given connection up or down is made by the transport management module 28, and the transport management server 52. Usually, the decisions will be made via the mobile device 35, but support exists for any form of negotiation or control between the two transport managers. The overall goal of the transport management protocol (21, 9) is to convey information between the two transport managers, so that they are both aware of the same current connection status. However, there are times when they must independently modify their own state, such as an unexpected connection close.

The transport managers use information from the user (other modules 25 for TMM 28, or other subsystems 54 for TMS), from the connection (connection modules 29-31 for the TMM 28, or border servers 45-47 for the TMS 54), and from the other transport manager to make decisions on connection changes.

Figure 5:
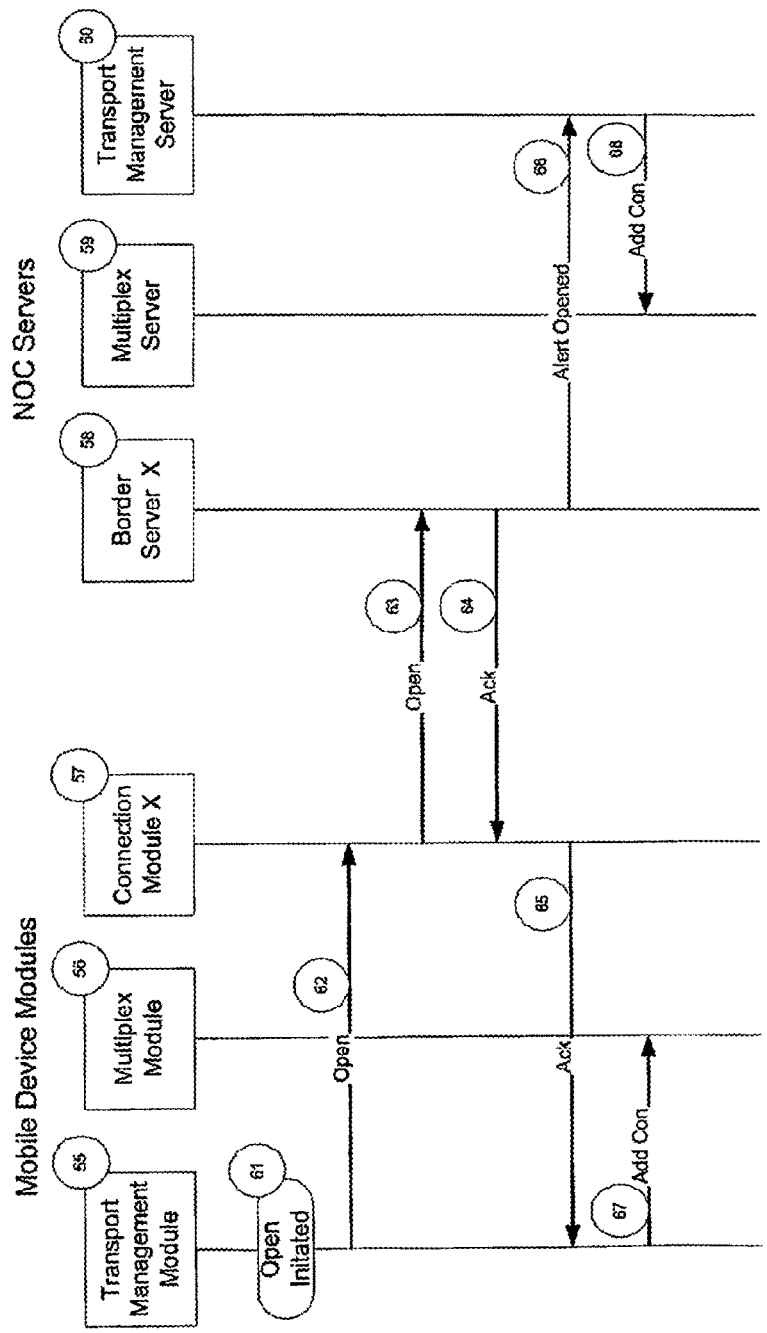
FIG. 5 is a protocol diagram showing the steps involved in connection establishment.

The process of establishing a new connection over another physical transport mechanism is shown in FIG. 5. In this Figure, the mobile device 35 has decided to initiate the connection. Should the NOC have decided to initiate the connection, the diagram would look similar, with the TMM 55 switched with the TMS 60, the MINI 56 switched with the MS 59, and the CM 57 switched with the base station 58.

The communications in the diagram represent asynchronous function calls between the modules, CoCo Multiplex over UDP between the various NOC Servers, and a particular encapsulation methods between the connection module 57 and the border server 58.

Walking Through of FIG. 5:
61. The TMM 55 decides to initiate a new connection using method X.
62. It alerts the correct connection module
63. Which opens the physical connection.
64. Which the connection modules notes,
65. And alerts the TMM
67. Which changes it's state and modifies the NM's settings as desired Meanwhile, on the other side of the connections
63. The Border Server receives the connections, causing it to
66. Alert the TMS of the new connections
68. Which then changes it's state and modifies the MM's settings as desired.

Figure 6:
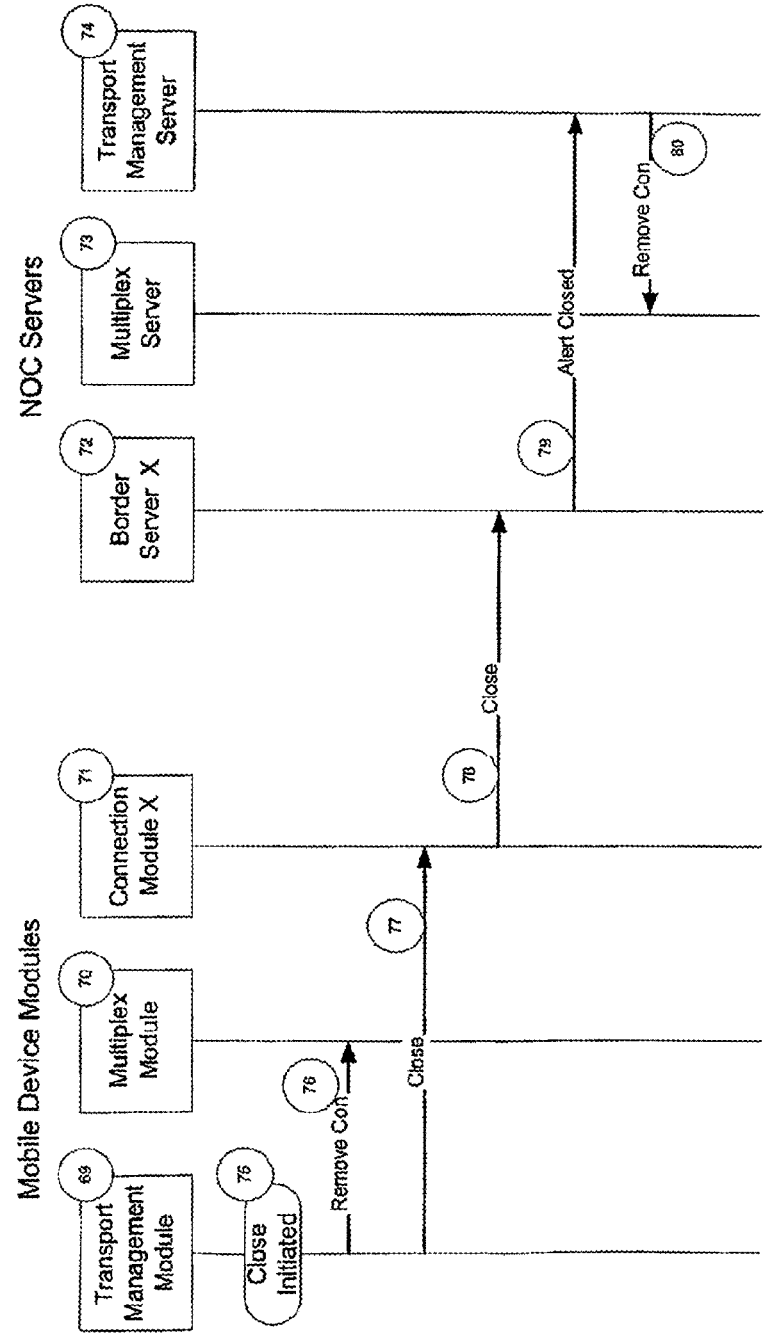
FIG. 6 is a protocol diagram showing the steps involved in connection teardown.

FIG. 6 shows the similar process of connection teardown. Again, the process is shown based on the mobile device causing the teardown. By making the same replacements described in the establishment section, the diagram would show the NOC causing the teardown. In the case of a spontaneous connection break, the connection module 71 and the border server 72 both alert the TMM 69 or the TMS 74 respectively via an 'Alert Closed' signal 79, which causes both sides to perform a 'Remove Con' action 80, resulting in a disconnected state.

Walking Though the Normal Case:
75. A close is initiated
76. The TMM removes the connection from the MM's 70 list, resulting in no further data being sent over the connection, as well as
77. Telling the correct CM 71 to close the module
78. Which it does
79. Resulting in the BS 72 noticing the close and alerting the TMS 74
80. Which calls 'Remove Con' 80 on the MS 73, resulting in no more data being sent over the connection in the reverse direction Overview of Multiplexing (Redundancy and Switching)

Mutliplexing refers to using more than one physical/logical network to transport data for a single higher level logical connection (the virtual connection). Two types of multiplexing are supported: Redundant and Switched. Redundant multiplexing involve sending the same data over more than one path, thus improving the chances for correct reception. Switched multiplexing involve splitting the data over multiple connections to improve throughput.

The CoCo model support both, including both simultaneously. For example, assume there are three physical connections, A, B, and C. One could always send data over C, as well as either A or B, switching between them. One could also use switched or redundant multiplexing across three or more parts. The two simplest cases (two connection switched multiplexing and two connection redundant multiplexing) are examined in FIGS. 7 and 8, as detailed below Data Transport in Two Connection Redundant Multiplexing In FIG. 7, we see data moving from the mobile to the NOC. The reverse process (moving data from NOC to mobile) is identical with the changes discussed in the connection section.

We begin with a packet entering at 89. The multiplex module 82 then sends the packet to both of the Connection Modules 83 and 84 as seen in (90, 92). Once at each module, the data is encapsulated and sent 91 and 94 to the respective border server at 85 and 86. Once the data is deencapsulated and sent (93, 95) to the multiplex server 87. Upon receiving the first packet 93 the multiplex server send the data over the internal network 96 to it's final destination. The second packet 95 is dropped. If however the first packet had been unable to make it, the second packet would have resulted in data still making it across.

Data Transport in Two Connection Switched Multiplexing

Figure 7:
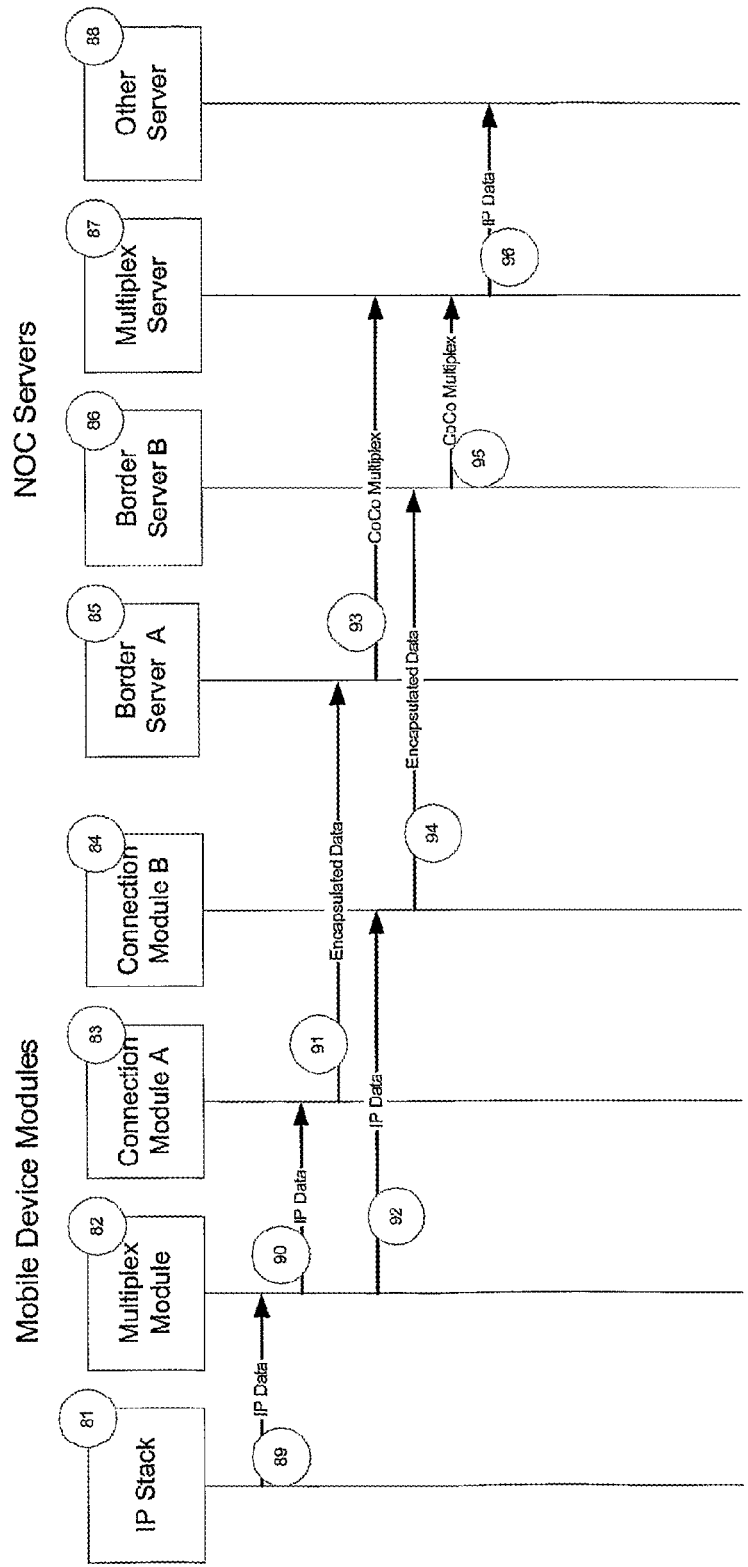
FIG. 7 is a protocol diagram showing the movement of data while redundant multiplexing is in operation.
Figure 8:
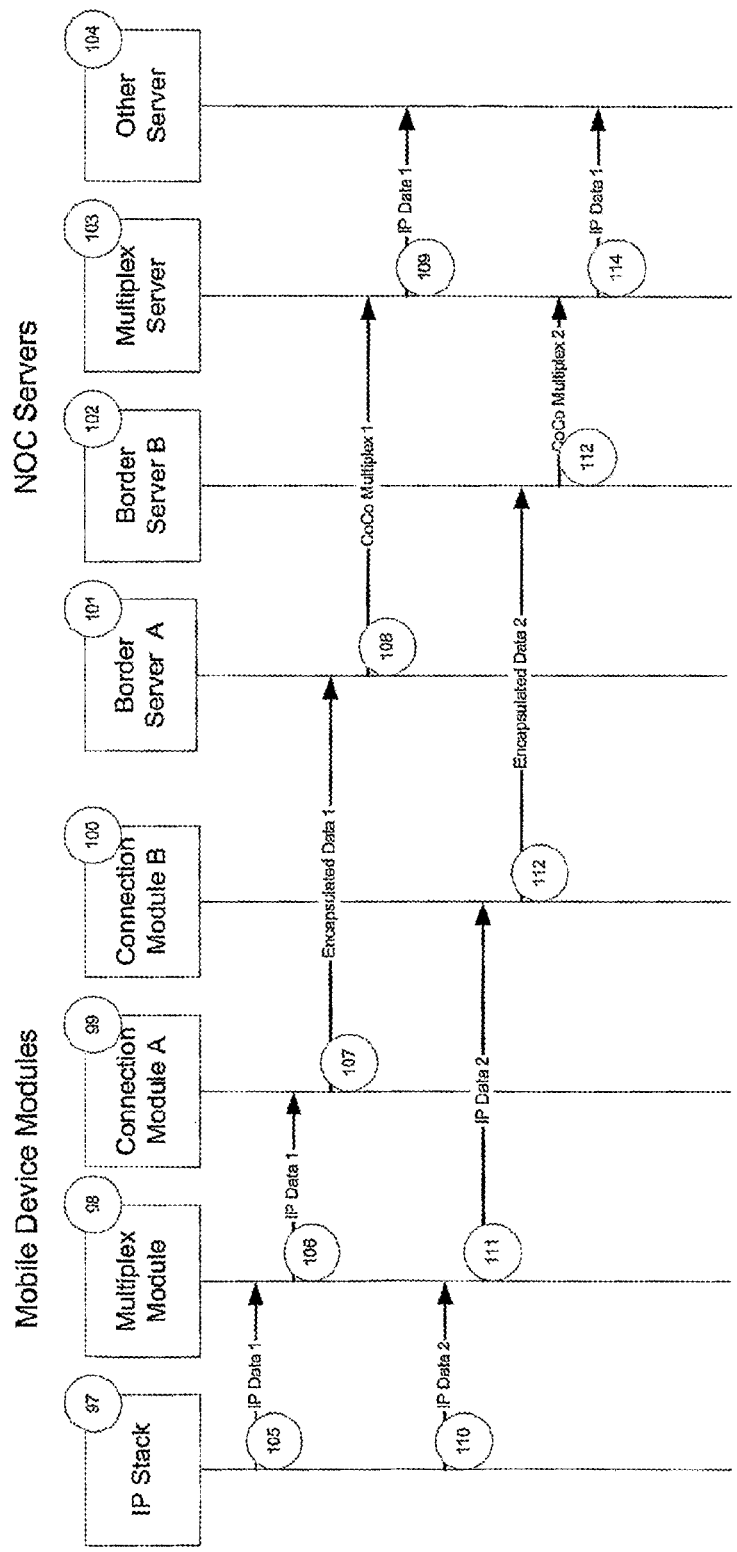
FIG. 8 is a protocol diagram showing the movement of data while switched multiplexing is in operation.

In FIG. 7, we see data moving from the mobile to the NOC. The reverse process (moving data from NOC to mobile) is identical with the changes discussed in the connection section.

We begin with packets 1 (105) arriving from the IP stack. Once in the MINI 98 one of the two connections modules is chosen based on current traffic conditions/cost/bandwidth/etc. In this case, CM A 99. The data is then sent at 106 to CM A (99) where it is encapsulated and send (107) to BS A (101) where it is deencapsulated and sent 108 to MS 103 which then forwards the data portion over the internal network to it's final destination 104.

Packet 2 arrives (110) and another CM is chosen, B in this case (100), the packet travels (111, 112, 113) to the same MS (103) at the NOC, and is sent in the same manner as the proceeding packet 1 to (104).

Use of Connection Redundancy During Handoff

Figure 9:
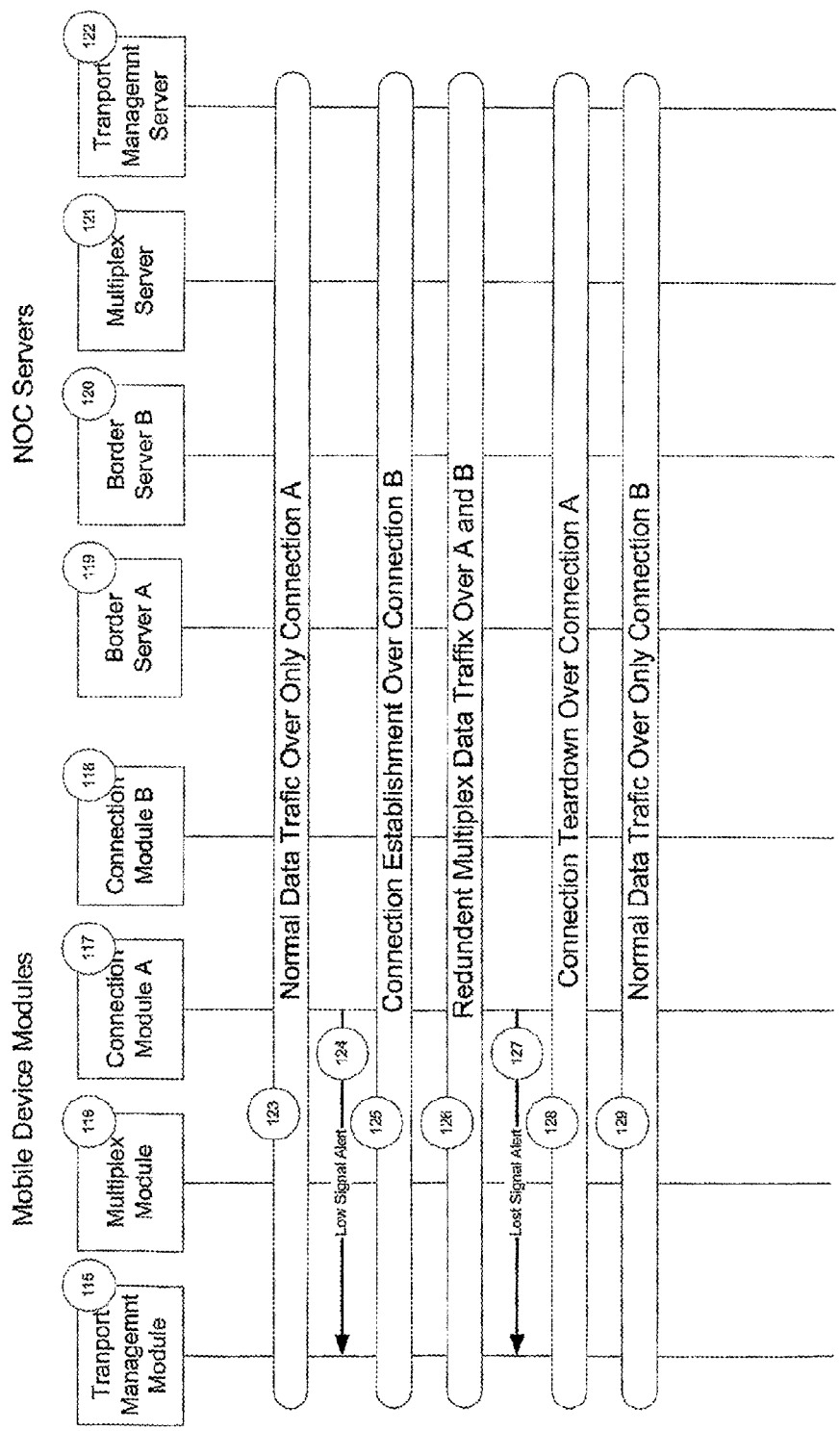
FIG. 9 is a protocol diagram which shows a connection handoff from one physical connection to another caused by fading signal strength.

FIG. 9 puts all the parts together and gives an example of a transparent connection handoff. We start out with normal data transfer over a single connection (123). The process really gets started when the connection module being used to deliver the data (Connection Module A, 117) notices a weakening signal strength and alerts (124) the TMM (115). At this point the TMM (115) begins a connection establishment over path B (125), using the methods diagramed in FIG. 5. Once this connection is established, the data flows using redundant multiplexing (126) as detailed in FIG. 7. Upon fully losing signal (127), the connection over A is torn down, which being a connection caused teardown is a modification of FIG. 6 as discussed in the section on connection teardown. This changes the MM (116) to now use the single connection B for it's data transfer, thus completing the handoff.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems. These and other changes can be made to the invention in light of the detailed description.

The elements and acts of the various embodiments described above can be combined to provide further embodiments. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

The invention claimed is:

1. A method of communicating a message between a mobile device and a destination device via a network operations center,
    wherein the network operations center is communicatively coupled to a first border server that is concurrently communicatively coupled to the mobile device over a first connection of a first communication system operating under a first protocol,
    wherein the network operations center is communicatively coupled to a second border server, and
    wherein the network operations center is communicatively coupled to the destination device,
the method comprising:
    encapsulating, at the mobile device, a first portion of the message into an encapsulated first packet using the first protocol;
    communicating the encapsulated first packet of the message from the mobile device to the first border server over the first connection;

in response to a weakening of the signal strength of communications over the first connection, communicatively coupling the mobile device to the second border server over a second connection of a second communication system operating under a second protocol,
wherein the second communication system is different from the first communication system,
encapsulating, at the mobile device, a second portion of the message into an encapsulated second packet using the first protocol and into an encapsulated third packet using the second protocol; and
substantially concurrently communicating the encapsulated second packet of the message from the mobile device to the first border server over the first connection and communicating the encapsulated third packet of the message from the mobile device to the second border server over the second connection.

2. The method of claim 1, further comprising:
monitoring signal strength of communications over the first connection.

3. The method of claim 1, further comprising:
in response to a complete loss of signal over the first connection, closing the first connection between the mobile device and the first border server.

4. The method of claim 3, wherein the first connection fails when a capacity of the first connection decreases below the threshold.

5. The method of claim 3, further comprising:
in response to closing the first connection,
encapsulating, at the mobile device, a subsequent third portion of the message into an encapsulated fourth packet using the second protocol; and
communicating the encapsulated fourth packet of the message from the mobile device to the second border server over the second connection.

6. The method of claim 1, wherein the mobile device is a laptop computer.

7. The method of claim 1, wherein the first protocol of the first connection is a wireline protocol, and wherein communicatively coupling the mobile device to the second border server over the second connection of the second communication system operating under the second protocol comprises:
communicatively coupling the mobile device to the second border server over the second connection of the second communication system operating according to a WiFi protocol.

8. The method of claim 1, wherein the first protocol of the first connection is a Wi-Fi protocol, and wherein communicatively coupling the mobile device to the second border server over the second connection of the second communication system operating under the second protocol comprises:
communicatively coupling the mobile device to the second border server over the second connection of the second communication system operating according to a CDMA protocol.

9. The method of claim 1, wherein the first protocol of the first connection is a Wi-Fi protocol, and wherein communicatively coupling the mobile device to the second border server over the second connection of the second communication system operating under the second protocol comprises:
communicatively coupling the mobile device to the second border server over the second connection of the second communication system operating according to a GSM protocol.

10. The method of claim 1, further comprising:
redundantly multiplexing communication via the first and second connection;
upon fully losing the signal of the first connection, communicating only via the second connection.

11. A mobile device that communicates messages with a destination device via a network operations center, wherein the network operations center is communicatively coupled to a first border server that is concurrently communicatively coupled to the mobile device over a first connection of a first communication system operating under a first protocol, wherein the network operations center is communicatively coupled to a second border server, and wherein the network operations center is communicatively coupled to the destination device, the mobile device comprising:
a processor; and
logic that is configured, when executed by the processor, to:
encapsulate a first portion of the message into an encapsulated first packet using the first protocol;
communicate the encapsulated first packet of the message from the mobile device to the first border server over the first connection;
in response to a weakening of the signal strength of communications over the first connection, communicatively couple the mobile device to the second border server over a second connection of a second communication system operating under a second protocol, wherein the second communication system is different from the first communication system,
encapsulate, at the mobile device, a second portion of the message into an encapsulated second packet using the first protocol and into an encapsulated third packet using the second protocol; and
substantially concurrently communicate the encapsulated second packet of the message from the mobile device to the first border server over the first connection and communicating the encapsulated third packet of the message from the mobile device to the second border server over the second connection.

12. The mobile device of claim 11, wherein the logic is further configured to:
monitor signal strength of communications over the first connection.

13. The mobile device of claim 11, wherein the logic is further configured to:
in response to a complete loss of signal over the first connection, close the first connection between the mobile device and the first border server.

14. The mobile device of claim 13, wherein the first connection fails when a capacity of the first connection decreases below the threshold.

15. The mobile device of claim 13, wherein the logic is further configured to:
in response to closing the first connection,
encapsulate, at the mobile device, a subsequent third portion of the message into an encapsulated fourth packet using the second protocol; and
communicate the encapsulated fourth packet of the message from the mobile device to the second border server over the second connection.

16. The mobile device of claim 11, wherein the mobile device is a cellular phone.

17. The mobile device of claim 11, wherein the first protocol of the first connection is a wireline protocol, and wherein the logic is further configured to:
  communicatively couple the mobile device to the second border server over the second connection of the second communication system operating according to a WiFi protocol.

18. The mobile device of claim 11, wherein the first protocol of the first connection is a Wi-Fi protocol, and wherein the logic is further configured to:
  communicatively couple the mobile device to the second border server over the second connection of the second communication system operating according to a CDMA protocol.

19. The mobile device of claim 11, wherein the first protocol of the first connection is a Wi-Fi protocol, and wherein the logic is further configured to:
  communicatively couple the mobile device to the second border server over the second connection of the second communication system operating according to a GSM protocol.

20. The mobile device of claim 11, wherein the logic is further configured to:
  redundantly multiplex communication via the first and second connection;
  upon fully losing the signal of the first connection, communicate only via the second connection.

* * * * *